C. C. EGERTON.
Thill-Coupling.
No. 224,408.        Patented Feb. 10, 1880.
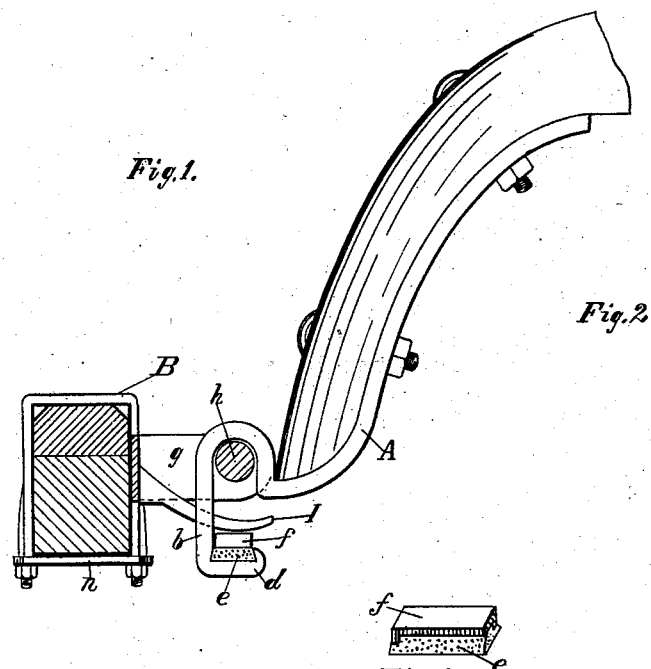
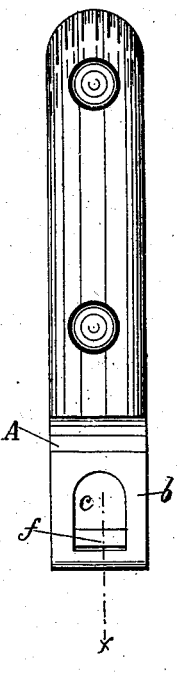
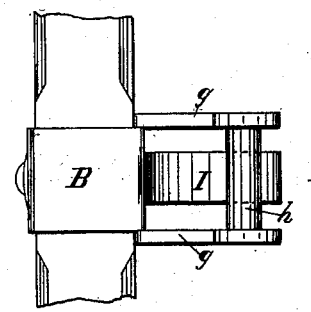
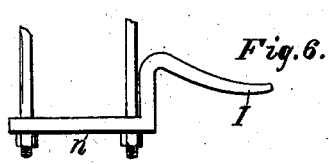
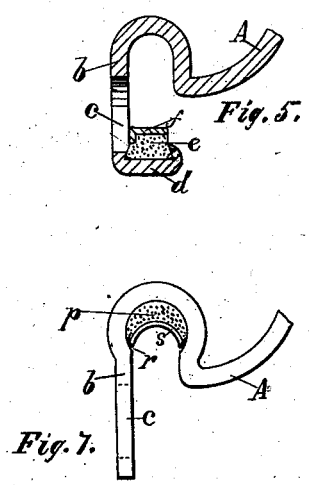
Witnesses:
Geo. A. Boyden
A. C. Eader
Inventor:
C. Calvert Egerton
By his Atty
Chas. B. Mann

United States Patent Office.

C. CALVERT EGERTON, OF BALTIMORE, ASSIGNOR OF ONE-HALF OF HIS RIGHT TO BENJAMIN G. HARRIS, OF SAME PLACE, AND WILLIAM CANBY, OF BALTIMORE COUNTY, MARYLAND.

THILL-COUPLING.

SPECIFICATION forming part of Letters Patent No. 224,408, dated February 10, 1880.

Application filed December 10, 1879.

*To all whom it may concern:*

Be it known that I, C. CALVERT EGERTON, of the city of Baltimore and State of Maryland, have invented a new and useful Improvement in Thill-Couplings, of which the following is a specification.

The object of this invention is to provide a thill and pole coupling for vehicles which may be readily disconnected or removed from the vehicle, and which shall embody such construction as will obviate the necessity of a detachable pin, and at the same time provide against rattling of the thill-iron.

In the drawings hereto annexed, Figure 1 is a side view of the coupling parts. Fig. 2 is a rear view of the thill and its iron. Fig. 3 is a plan or top view of the clip and parts attached to the axle. Fig. 4 is a perspective view of the rubber cushion and its protecting plate, one end being in section. Fig. 5 is a section of the thill-iron, taken through $x$ $x$ in Fig. 2. Fig. 6 shows a modification of the axle clip-plate in which the curved lug is integral therewith. Fig. 7 shows a modification in which the rubber is secured in the thill-iron above the coupling-pin.

The letter A designates the thill-iron, and B the axle-clip. The thill-iron at the point where it hooks over the coupling-pin is in the form of an inverted letter U. The part $b$ that hooks over the pin depends below and has a hole or opening, $c$. Provision is made for the attachment of a rubber cushion to prevent rattling.

In Figs. 1, 2, and 5 the part $b$ of the thill-iron has its extremity bent horizontally forward and then up, to form a rest or seat, $d$, for the rubber cushion $e$, which is retained in place by the sides of the seat being beveled to form an enlargement at the bottom, thus permitting the rubber to expand. This rubber cushion is covered on top by a metal plate, $f$, to protect it from wear, and is provided on one side and both ends with a downturned flange, whereby it keeps its place.

The axle-clip is provided with two projecting lugs or ears, $g$, of ordinary form, and to these a coupling-pin, $h$, is permanently attached. A curved lug, I, is forged to the clip and projects between the ears and below the pin, curving downward and forward, its lower side forming a segment of a circle of which the coupling-pin is the center. This curved lug is of size to enter the hole $c$ in the part $b$ of the thill-iron, and it will be seen that when the latter is hooked over the pin the part $b$ may swing, as it were, so as to slide the protecting-plate $f$ along the lower side of the curved lug. Sufficient space is left between the pin and the curved lug below it to permit the thill-iron part $b$, with its seat $d$ and cushion, to pass. Then when the inverted-U part of the thill-iron rests on the pin the part $b$ swings back and the curved lug enters the hole $c$.

It will be seen the rubber cushion, by bearing on the under side of the curved lug, holds the thill-iron down on the pin, and thereby prevents rattling, while the curved lug prevents the accidental uncoupling of the thill-iron. The parts will not uncouple until the part $b$ is swung far enough forward to release itself from the curved lug.

A modification of the mode of attaching the curved lug is shown in Fig. 6, where the lug is integral with the clip-plate $n$, which secures the threaded ends of the clip on the lower side of the axle. This form possesses the advantage over that shown in the other figures of being more cheaply produced.

A modification of the manner of attaching the rubber where the part $b$ of the thill-iron hooks over a pin and loops under a curved lug, as here shown, consists in enlarging the inverted-U part so as to swell said part and form on each side an internal shoulder, $r$. The rubber $p$ is forced into position in the enlarged part, and a semi-cylindrical plate of metal, $s$, has its edges resting on the shoulders and protects the rubber from the wear of the pin. In this form the horizontal seat $d$ at the extremity of the part $b$ is dispensed with.

Having described my invention, I claim and desire to secure by Letters Patent of the United States—

1. In a thill-coupling, the combination, substantially as set forth, of ears $g$, to which the coupling-pin is attached, a lug, I, curving downward and forward below the coupling-pin, and a thill-iron adapted to hook over the pin, and having a part, b, to extend below, which is provided with a hole adapted to receive the curved lug.

2. In a thill-coupling, the combination, substantially as set forth, of ears g, to which the coupling-pin is attached, a lug, I, curving downward and forward below the coupling-pin, and the thill-iron adapted to hook over the pin and extend below, and provided with a hole to receive the lug, and having at its extremity a horizontal seat, d, adapted to retain a rubber cushion.

In witness whereof I hereunto set my hand this 9th day of December, 1879.

C. CALVERT EGERTON.

Witnesses:
T. J. BROWN, Jr.,
GEORGE A. KELLER.